United States Patent
Sagot et al.

(10) Patent No.: US 10,608,875 B2
(45) Date of Patent: Mar. 31, 2020

(54) METHOD FOR DYNAMICALLY CONFIGURING A NETWORK COMPRISING A PLURALITY OF SUBNETS

(71) Applicant: SERCEL, Carquefou (FR)

(72) Inventors: Pierre Sagot, Carquefou (FR); Julien Baron, Carquefou (FR)

(73) Assignee: SERCEL, Carquefou (FR)

( * ) Notice: Subject to any disclaimer, the term of this patent is extended or adjusted under 35 U.S.C. 154(b) by 86 days.

(21) Appl. No.: 15/515,389

(22) PCT Filed: Sep. 29, 2015

(86) PCT No.: PCT/IB2015/001974
§ 371 (c)(1),
(2) Date: Mar. 29, 2017

(87) PCT Pub. No.: WO2016/051263
PCT Pub. Date: Apr. 7, 2016

(65) Prior Publication Data
US 2017/0222877 A1 Aug. 3, 2017

(30) Foreign Application Priority Data

Sep. 30, 2014 (EP) .................................... 14306525

(51) Int. Cl.
*H04L 12/24* (2006.01)
*H04L 29/12* (2006.01)
(Continued)

(52) U.S. Cl.
CPC ............ *H04L 41/0816* (2013.01); *G01V 1/00* (2013.01); *H04L 45/02* (2013.01);
(Continued)

(58) Field of Classification Search
CPC . H04L 41/0816; H04L 45/02; H04L 61/2015; H04L 61/6068; G01V 1/00; H04W 40/24
(Continued)

(56) References Cited

U.S. PATENT DOCUMENTS

| | | | |
|---|---|---|---|
| 7,035,240 B1* | 4/2006 | Balakrishnan | H04W 84/18 370/338 |
| 7,463,654 B2 | 12/2008 | Riegel et al. | |
| 2005/0055418 A1* | 3/2005 | Blanc | H04L 41/30 709/209 |

(Continued)

OTHER PUBLICATIONS

International Search Report dated Feb. 5, 2016.
(Continued)

*Primary Examiner* — Obaidul Huq
(74) *Attorney, Agent, or Firm* — IPSILON USA, LLP

(57) ABSTRACT

A method is developed for dynamically configuring a network with numerous subnets, each subnet comprising at least one router node and said network comprising at least one subnet server. For enhancing the efficiency, the determination of a subnet master for configuring a subnet is carried out with two parallel processes:
  election of a subnet master among the router nodes of said subnet
  allocation to each router node of said subnet of a subnet identifier.
Configuration of the subnet, achieved by the subnet master with its allocated subnet identifier, is refreshed regularly, in particular when detecting a change in the configuration of the network.

17 Claims, 9 Drawing Sheets

(51) Int. Cl.
*H04L 12/751* (2013.01)
*G01V 1/00* (2006.01)
*H04W 40/24* (2009.01)

(52) U.S. Cl.
CPC ...... *H04L 61/2015* (2013.01); *H04L 61/6068* (2013.01); *H04W 40/24* (2013.01)

(58) Field of Classification Search
USPC ........................................................ 370/254
See application file for complete search history.

(56) References Cited

U.S. PATENT DOCUMENTS

2013/0016625 A1* 1/2013 Murias ................. H04W 8/005
370/254
2013/0097335 A1* 4/2013 Jiang .................. H04L 61/2528
709/245
2015/0365911 A1* 12/2015 Mohandas .......... H04W 56/001
370/338

OTHER PUBLICATIONS

Automatic Configuration Method for IP routers in dynamically changing network dated May 1, 2006.
IPv6 Prefix options for Dynamic Host Configuration Protocol (DHCP) version 6 dated Dec. 2003.
Mini-DHCP Election Option for DHCP dated Mar. 2000.
No Administration Protocol (NAP) for IPv6 Router Auto-Configuration dated Mar. 25, 2005.
International Search Report dated Dec. 3, 2019.

* cited by examiner

METHOD FOR DYNAMICALLY CONFIGURING A NETWORK COMPRISING A PLURALITY OF SUBNETS

RELATED APPLICATION

This application is a National Phase Application of PCT/IB2015/001974 filed on Sep. 29, 2015, which in turn claims the benefit of priority from European Patent Application No. 14 306 528.8 filed on Sep. 30, 2014 the entirety of which are incorporated herein by reference.

1. FIELD OF THE INVENTION

Present invention concerns communication networks. More specifically, the invention relates to a technique for dynamically configuring a network comprising a plurality of subnets.

The present invention can be applied notably, but not exclusively, to the communication network of a seismic data acquisition system. To collect geophysical data, the principle of operation of a seismic data acquisition system is as follows. For a seismic survey, one or several seismic sources (explosives, falling weights, vibrators, air guns, etc.) are activated to propagate omnidirectional seismic wave trains; the wave trains are reflected by the layers of the subsurface are detected by seismic sensors, which generate a signal characterizing the reflection of the waves on the geological interfaces of the subsurface. A map of the prospected subsoil can be constructed after processing the reflected wave trains (echoes). The seismic data acquisition system can be applied notably to the oil exploration industry.

In the description below, we consider the following generic terminology:
- a network comprises a plurality of network nodes;
- each network node comprises at least one interface, each interface enabling to connect the node to a distinct subnet (e.g. with a first and a second interface, the node is enabled to connect to a first and a second subnet, possibly of different types);
- a router node is a node having at least two interfaces activated (i.e. a node connected simultaneously to at least two subnets);
- a non-router node is a node having only one interface activated (i.e. a node connected to only one subnet);
- the status (router or non-router) of a node may change over time;
- a subnet comprises nodes connected together by a same type of interface;
- via the router nodes, several subnets can be connected (coupled) together in a cascade configuration, thus defining successive levels of subnets.

2. TECHNOLOGICAL BACKGROUND

It is sought more particularly here below in this document to describe problems existing with the communication network of a seismic data acquisition system. The invention of course is not limited to this particular application but is of interest for any communication network that has to cope with closely related or similar issues and problems.

Typically, and as shown in FIG. 1, a seismic data acquisition system comprises a network connected to a central unit 4. In a wired implementation, the network comprises a plurality of concentrators 2,3 (i.e., according to the aforesaid generic terminology, "network nodes", e.g. network nodes having an IP address) distributed along two types of subnets, also referred to as "lines", usually wired lines: sensor lines 5 (also referred to as "acquisition lines") and backbone lines 6 (also referred to as "transverse lines").

Each concentrator 2,3 has two interfaces: a sensor line interface and a backbone line interface. When both of these interfaces are activated, the concentrator is a router concentrator 3 (i.e. a "router node"). When only the sensor line interface or the backbone interface is activated (i.e. when the concentrator is connected only to a sensor line or to only a transverse line), the concentrator 2 is non-router.

The use of sensor lines 5 and backbone lines 6 creates loops and allows seismic data to be transmitted through multiple paths. This topography with loops may avoid loosing data due to cable cuts.

The central unit 4 collects all the seismic data from seismic sensors 9 (see description below), via data acquisition units 1 (see description below) and the concentrators 2,3. The data acquisition system may be used on land or at sea (in the second case, the central unit 4 is generally on board of a ship).

A sensor line 5 (first type of subnet) comprises one or several router concentrators 3 (which are "network nodes" each connected by their sensor line interface to the sensor line) and non-router concentrators 2 (which are also "network nodes" each connected by their sensor line interface to the sensor line), assembled in series along with data acquisition units 1 (which are not "network nodes" according to above definition). In other words, a sensor line 5 is defined as a first type of subnet comprising concentrators connected together by their sensor line interface. A set of data acquisition units 1 connected to a concentrator 2,3 at least at one end is called a "segment", which thereby is a portion of a sensor line 5. Each concentrator 2,3 (i.e. each "network node") locally manages communication on a segment, supplies power to the data acquisition units 1 of this segment and receives seismic data generated by the data acquisition units 1 of this segment.

A backbone line 6 (second type of subnet) comprises router concentrators 3 assembled in series by their backbone line interface. Backbone lines can comprise non-router concentrators 2, but no data acquisition units 1 and have a high data-rate to rapidly transfer data. The central unit 4 is connected to at least one of the backbone lines 6.

Each data acquisition unit 1 is associated with at least one seismic sensor 9. The data acquisition units 1 process signals transmitted by the seismic sensor(s) 9 and generate seismic data. The sensors 9 are either analog sensors or digital sensors. When analog sensors (also referred to as "geophones") are used, they are generally interconnected by cables to form clusters referred to as "strings of geophones". One or several of these strings of geophones (in series or in parallel) are connected to each data acquisition unit 1 (which, in this case, is also referred to as FDU, for "Field Digitizing Unit") and this latter performs an analog to digital conversion of the signal from the groups of geophones and sends these seismic data to the central unit 4 (via the concentrators 2,3). When digital sensors are used (e.g. micro-machined accelerometers, or "MEMS-based digital accelerometers"), they are usually integrated in the data acquisition units 1 (which, in this case, are also referred to as DSUs, for "Digital Sensor Units").

In practice, the complexity of the communication network is often high. Indeed, the network comprises many subnets, with concentrators 2,3 connected to a great number of data acquisition units 1.

Moreover, the communication network may comprise a great number of subnet levels since the backbone line connected to the central unit (i.e. a first level subnet) is connected to one or several sensor lines (i.e. second level subnets), which themselves can be connected to one or several backbone lines (i.e. third level subnets), etc.—with an alternating, from one level to the other, between backbone lines and sensor lines, i.e. between first and second types of subnet for most seismic acquisition systems.

In addition, the topography of the communication network may change depending on the addition and removal of concentrators and cable cuts: existing subnets can be modified or removed, and new subnets can be added. Indeed, at any times, operators may connect and disconnect some cables of the existing network to install new concentrators, or also remove or move existing concentrators. The cables may also be partially or completely cut due to environmental stresses, thus also modifying the network topology.

In a network comprising a plurality of subnets (notably, but not exclusively, the communication network of a seismic data acquisition system), each subnet has to be configured, i.e. a distinct subnet identifier has to be associated with (i.e. allocated to) each subnet. In practice, a subnet identifier (e.g. 172.27.30.32/27) often consists of a subnet address (172.27.30.32 in aforesaid example) and a subnet mask (27 in aforesaid example).

A first known solution for configuring subnets is disclosed in the Request For Comment 6656, published by CISCO in July 2012 (ISSN: 2070-1721), with a DHCP (Dynamic Host Configuration Protocol) option that allows a DHCP client to request and obtain a subnet identifier from a DHCP server. This solution should allow a completely dynamic network configuration. But its implementation is cumbersome and complicated when the network comprises more than two (and a fortiori a great number of) subnet levels as defined above since only hierarchical transmission is foreseen.

A second known solution for configuring subnets is disclosed in U.S. Pat. No. 6,917,977, with a decentralized mechanism for an automatic allocation of subnets identifiers in a network. This solution may take a long time in case of many subnets. Moreover, it doesn't meet the challenges of frequent topology changes. If an operator makes a communication path between two subnets, address conflicts may occur. As the mechanism disclosed in this document is decentralized, this conflict will be very difficult to solve.

3. SUMMARY OF THE INVENTION

The invention, in at least one embodiment, is aimed especially at overcoming these different drawbacks of the prior art.

A particular embodiment of the invention proposes a method for dynamically configuring subnets of a network, preferably of a seismic data acquisition system. Such networks comprise a plurality of nodes arranged in subnets, which thereby comprise at least one router node with at least two interfaces enabling connection of said router node to two different subnets, and at least a subnet server able to provide subnets identifiers at request.

The method comprises a step for determining, for each subnet, a subnet master among router nodes and subnet server belonging to said subnet, made of two parallel processes, such as to increase efficiency: router nodes (and subnet server) are provided, at their request, with a subnet identifier by a subnet server, and their node identification information is compared for election of the subnet master. The method then comprises a step of configuring the subnet by the elected subnet master with the received subnet identifier.

Preferably, the configuration is regularly checked, with the subnet master sending a frame with information of its status, and the nodes verify whether the reception of this frame indicates a modification of the configuration of the network, either by loss of reception meaning a cut, or by modification of the identifier when a new link is made, or any other. When the verification indicates such a change, some steps of the configuration method are carried out again, thereby allowing an efficient adaptation to changes in networks.

The configuration of the network preferably is also refreshed, with use of a validity duration of the subnet identifier, and periodic verification by the subnet master of the maintenance of its status by requesting an acknowledgement to the subnet server. Similarly, some steps of the method are repeated in case of end of the validity. The invention also relates to a computer program for implementing said method.

Another embodiment of the invention concerns nodes suitable for carrying out the configuration method, with dedicated means for transmitting requests and identification information, and dedicated means for receiving subnet identifier and node identification information. Preferably, the nodes are made as seismic acquisition concentrators, and most preferably, they are arranged in seismic data acquisition systems with backbone and acquisition lines allowing redundant communication to a central unit.

According to an embodiment, it is proposed a method for dynamically configuring a subnet of a network of nodes, which nodes comprise at least a first interface enabling a connection to a subnet, wherein at least one of said nodes, being defined as a router node, is able to be connected through said first interface to said subnet to be configured and comprises at least a second interface enabling connection of said router node to a different subnet, said method comprising:

a first identification step of identifying at least one subnet server among the nodes of the network, said at least one subnet server being associated with the nodes of said subnet and able to provide subnet identifiers at request;

a second determination step of determining of a subnet master of said subnet among candidates, said candidates comprising the router node(s) and, if any, a subnet server of said subnet, said second determination step comprising, run in parallel:

a first process of election of a subnet master comprising: comparing node identification information of all candidates and determining the subnet master among the candidates in result of the comparison, a second process of allocation of subnet identifiers to the candidates comprising:

a first step of transmitting by each of the candidates a request to the corresponding associated subnet server, a second step of receiving by said candidates, in response to said request, at least one subnet identifier enabling to configure said subnet, a third configuration step of configuring the subnet by the elected subnet master with the received subnet identifier.

According to a particular aspect, the method comprises the following steps:

transmitting, by a first node of the subnet, a frame comprising a subnet server identification of the subnet server associated with said first node;

receiving said frame by a second node of the subnet, and comparing the subnet server identification included in the received frame with a subnet server identification associated with said second node; and if said subnet server identifications are not identical: electing one of said subnet servers.

According to another particular aspect, the method further comprises: if said subnet server identifications are identical and if the current state of both first and second nodes is subnet master: new step of election of the subnet master for the subnet.

According to another particular aspect, each of said subnet server identifications is associated with a weighted parameter and wherein electing one of said subnet servers results from the comparison of these subnet server weighted parameters.

According to another particular aspect, the request transmitted to said corresponding associated subnet server in the second allocation process is parameterized with a logical address of said corresponding associated subnet server as a destination logical address.

According to another particular aspect, the node identification information of the candidates of said subnet is the physical address associated with an interface through which the candidate is connected to said subnet.

According to another particular aspect, the method comprises:
periodical emission by the subnet master, of a frame comprising a status information of said subnet master;
reception of said frame by the nodes of said subnet;
verification of said reception by the nodes for detecting a change in the configuration of the network.

According to another particular aspect, the verification indicates to said nodes that reception is lost, the method being then repeated from the second determination step.

According to another particular aspect, the frame comprises a subnet server identification information of a subnet server associated with the subnet master, and a subnet server weighted parameter.

According to another particular aspect, the verification of the reception indicates to said nodes that subnet server identification has been modified, the method being then repeated from the first identification step.

According to another particular aspect, the verification of the reception indicates to said nodes that subnet server identification has not been modified, the method comprising then a new step of election of the subnet master for said subnet.

According to another particular aspect, the verification of the reception indicates to said nodes that subnet server identification has not been modified, the method comprising then a new step of election of the subnet master for said subnet.

According to another particular aspect, the second allocation process provides, together with the subnet identifier, a validity duration of said subnet identifier, the method being repeated from the second determination step when the validity duration is expired.

According to another particular aspect, the allocation process comprises a fourth confirmation step, carried out before or after the third configuration step, wherein the elected subnet master requests to the corresponding associated subnet server within a period of time less that the validity duration whether the subnet identifier can be kept, and
if yes, the validity period of the subnet identifier is reinitialized,
if no, then the method is repeated from the second determination step.

According to an embodiment it is also proposed a method for dynamically configuring a network with a plurality of subnets comprising the method for dynamically configuring a subnet of said network as recited above, wherein the second determination step and the third configuration step are carried out for each subnet comprising at least one router node.

According to a particular aspect, the network is a seismic data acquisition network whose nodes are concentrators receiving seismic data, wherein the plurality of subnets comprises acquisition lines and backbone lines.

According to an embodiment it is also proposed a method for dynamically configuring a network comprising a plurality of subnets comprising the method for dynamically configuring a subnet of said network as recited above, wherein the second determination step and the third configuration step are carried out for each subnet comprising at least one router node, the validity duration being identical for each subnet.

According to an embodiment, it is proposed a non-transitory computer-readable carrier medium storing a computer program that includes program code instructions for implementing the method recited above.

According to an embodiment, it is proposed a node comprising a processing unit and at least two interfaces enabling a connection with two different subnets, said processing unit comprising:
means for transmitting a request to a subnet server;
means for receiving a subnet identifier in response to the request
means for emitting a frame comprising information relative to an identification of said node;
means for receiving frames comprising information relative to the identification of said node.

According to a particular aspect, the processing unit further comprises means for seismic data acquisition.

According to an embodiment, it is proposed an acquisition system comprising a plurality of subnets of a network, each subnet comprising nodes including at least one node as recited above with two interfaces connected to two different subnets of said network, said system comprising means for comparing node identification information of the nodes and means for electing subnet masters for each subnet in function of the result of the comparison.

According to an embodiment, it is proposed an acquisition system comprising a plurality of subnets of a network, each subnet comprising nodes including at least a seismic concentrator as recited above with two interfaces connected to two different subnets of said network, said system comprising means for comparing node identification information of the nodes and means for electing subnet masters for each subnet in function of the result of the comparison.

According to a particular aspect, the acquisition system comprises a computer program that includes program code instructions for implementing the method recited above.

Invention is defined as in appended claims.

4. LIST OF FIGURES

Other features and advantages of embodiments of the invention shall appear from the following description, given by way of indicative and non-exhaustive examples and from the appended drawings, of which:

5. DETAILED DESCRIPTION

In all of the figures of the present document, identical elements and steps are designated by the same numerical reference sign.

Figure 2:
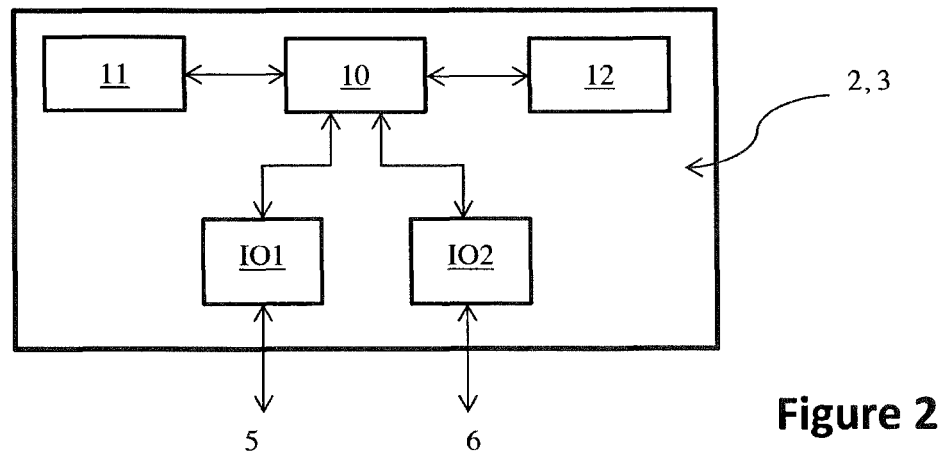
FIG. 2 depicts a block diagram of a node, according to an embodiment of the invention.

FIG. 2 depicts a block diagram of a node, for example a seismic concentrator 2, 3.

The node comprises a non-volatile memory 11 (e.g. a read-only memory (ROM) or a hard disk), a volatile memory 12 (e.g. a random access memory or RAM) and a processor (or CPU) 10. It comprises a first input/output interface IO1, for connecting the node with a first subnet (e.g. a sensor line 5), and a second input/output interface IO2, for connecting the node with a second subnet (e.g. a backbone line 6). Below, the first and second input/output interfaces IO1, IO2 are also referred to as "sensor line interface" and "backbone line interface" respectively.

When both first and second interfaces IO1, IO2 are activated (i.e. when the node is connected to a sensor line 5 and a backbone line 6), the node is a router node 3. When only the first interface IO1 or only the second interface IO2 is activated (i.e. when the node is connected only to a sensor line 5 or only to a backbone line 6), the concentrator is a non-router concentrator 2. Nodes 2 which are not supposed to be router nodes could comprise only one interface; nodes may also comprise more than two interfaces, e.g. an additional interface for radio communication or any other.

The non-volatile memory 11 is a non-transitory computer-readable carrier medium. It stores executable program code instructions, which are executed by the processor 10 in order to enable implementation of the method described below. Upon initialization, aforementioned program code instructions are transferred from the non-volatile memory 11 to the volatile memory 12 so as to be executed by the processor 10. The volatile memory 12 likewise includes registers for storing the variables and parameters required for this execution.

All the steps carried out by the node 2,3 can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the invention is not limited to a purely software-based implementation, in the form of computer program instructions, but that it can also be implemented in hardware form or any form combining a hardware portion and a software portion.

Figure 3:
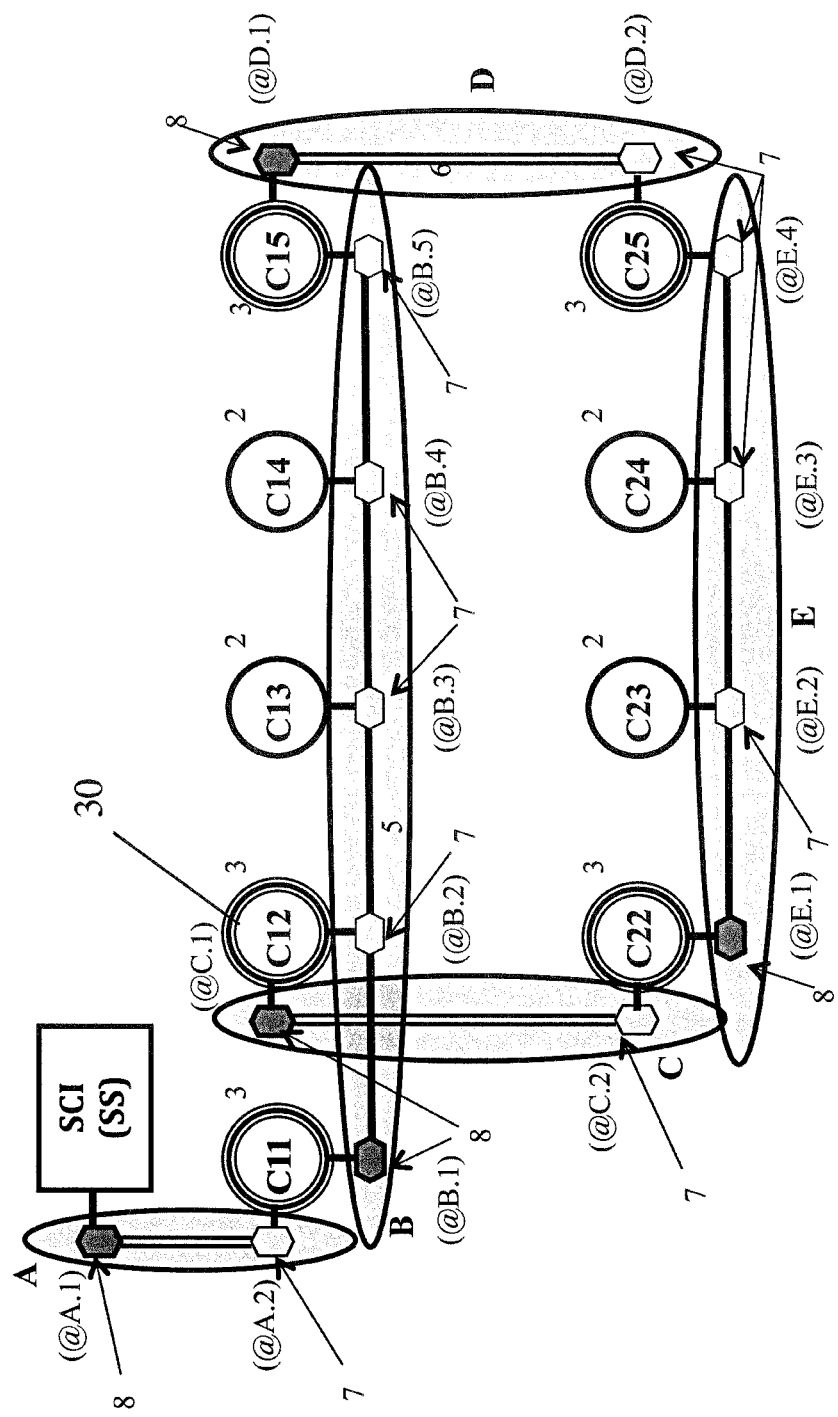
FIG. 3 shows an example of network comprising subnets configured according to an embodiment of the invention.

FIG. 3 shows an example of network comprising five subnets A to E, configured according to an embodiment of the invention, with non-router nodes 2 and router nodes 3. Each subnet contains at least one router node 3, among which a subnet master which uses a DHCP server 8 on its interface through which it is connected to said subnet. Using a subnet identifier assigned to this subnet, the DHCP server 8 configures the logical addresses (e.g. IP addresses) of all the interfaces through which other nodes are connected to this subnet. To this end, each of these other nodes comprises a DHCP client 7 on the interface through which this other router node is connected to this subnet.

In the example of FIG. 3, the five subnets connect the following nodes:
- Subnet A (a backbone line 6): nodes SCI (for "System Controller Interface") and C11, node SCI being the subnet master;
- Subnet B (a sensor line 5): nodes C11, C12, C13, C14 and C15, node C11 being the subnet master;
- Subnet C: nodes C12 and C22, node C12 being the subnet master 30;
- Subnet D: nodes C15 and C25, node C15 being the subnet master;
- Subnet E: nodes C22, C23, C24 and C25, node C22 being the subnet master.

A device called subnet server SS is configured to provide the subnet identifiers of all subnets of the network. According to a preferred embodiment, a subnet address (i.e. a logical address, e.g. an IP address) and a subnet mask form a subnet identifier. Advantageously, the subnet server SS is comprised in the SCI node, or in a device connected to it, but it may also be comprised in any other node. In this simplified example, the subnet server SS is centralized and can communicate with each node 2 and router node 3.

For configuration of a given subnet of the network, router nodes 3 which are candidates to be subnet master communicate with the subnet server SS to receive at least one subnet identifier. If this subnet identifier is formed by a subnet IP address and an IP mask, it is used to configure the IP address of an IP interface by which the router node 3 is connected to this subnet. The subnet identifiers may change at any time due to new connection or line cut.

Figure 7:
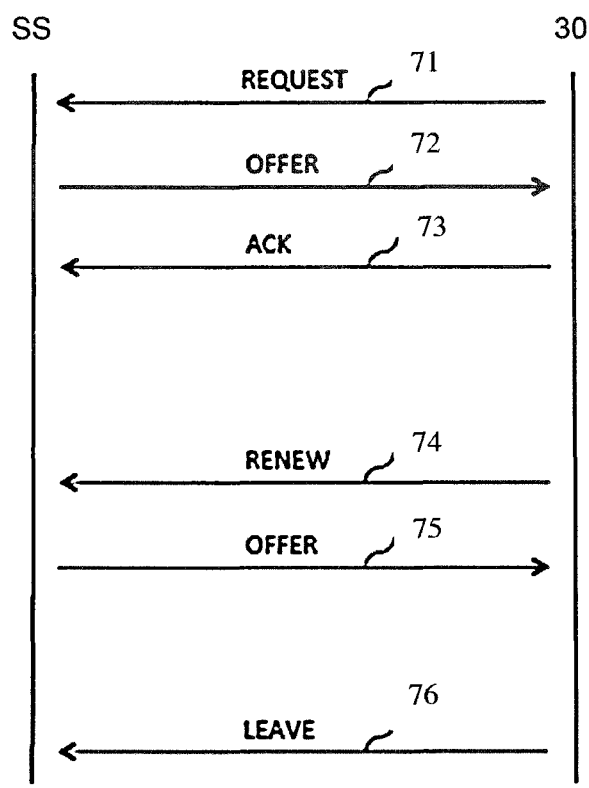
FIG. 7 is a sequence diagram of communication between a subnet server and a subnet master, according to a particular embodiment of the invention.

FIG. 7 is a sequence diagram of communication between the (centralized) subnet server SS and a subnet master 30 of a given subnet, according to an embodiment of the invention, wherein the subnet master 30 has already been selected among possible candidates within the network.

The subnet master 30 asks for a subnet identifier to the subnet server SS: in step 71, the subnet master sends a REQUEST frame to the subnet server. The REQUEST frame is parameterized with a logical address (e.g. IP address) of the subnet server as a destination logical address. Except for the subnet comprising the subnet server, the logical address of the subnet server is not a logical address of the given subnet.

In step 72, the subnet server responds by an OFFER frame that contains at least one subnet identifier, and a validity period (typically 10 minutes). The subnet master receives the OFFER frame and in step 73 returns an acknowledgment (ACK frame).

In an alternative embodiment, and in particular at the first configuration of the network wherein no subnet master has been identified yet for the subnet, steps 71 to 73 are carried out by the router nodes of the given subnet which are candidates to become the subnet master (each candidate receives an OFFER frame containing at least one subnet identifier). Among the candidates for being subnet master, one can also include subnet servers which belong to said subnet if any. Then, only the candidate which has been elected (i.e. only the subnet master) uses the at least one subnet identifier it has received for configuration; election process is disclosed later.

During the validity period, the elected subnet master 30 preferably sends to the subnet server (in step 74) a RENEW frame for asking to keep the current subnet identifier. The RENEW frame is sent e.g. at least once at half of the validity period (for example 5 minutes). If all goes well, the subnet server responds in step 75 with a new OFFER frame indicating that the current subnet identifier is maintained, and a new validity period may be used by the subnet master 30 to set its timer. In the absence of step 75, meaning that the communication channel with the subnet server is unavailable probably due to a line cut, or if the validity period ends (e.g. with subnet master 30 unable to perform step 74), the subnet identifier is no longer valid.

If the subnet master 30 no longer uses the subnet identifier, then in step 76 it preferably sends a LEAVE frame to the subnet server. When receiving the LEAVE frame, the subnet server releases the subnet identifier. Thus the subnet identifier can be reused more quickly than waiting for the end of a validity period (timeout).

Figure 4:
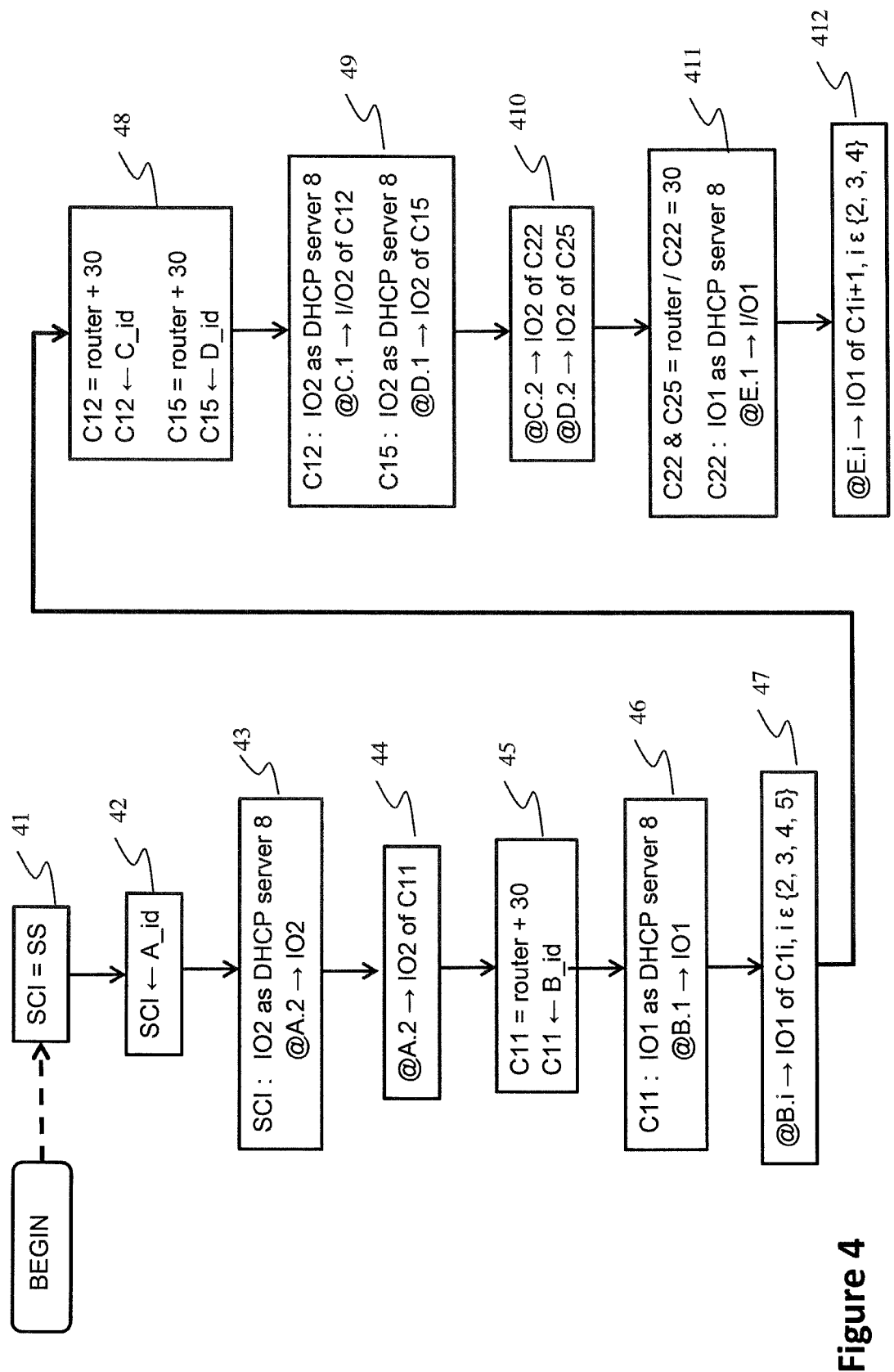
FIG. 4 is a flowchart of the implementation of an embodiment of the method according to the invention, enabling to obtain the network as configured in FIG. 3.

FIG. 4 is a flowchart of the implementation of an embodiment of the method according to the invention, enabling to obtain the network as configured in FIG. 3. At least some steps are executed by a computer program stored in a program memory of the subnet server.

In step 41, a node (here SCI) is chosen to be the subnet server SS of at least a part of the network, with assignation of following subnets identifiers (logical address/mask):
A_id: 10.0.0.0/x
B_id: 10.1.0.0/x
C_id: 10.2.0.0/x
D_id: 10.3.0.0/x
E_id: 10.4.0.0/x In this illustrated example, only five subnet identifiers are shown. It is obvious that this number may considerably change.

In step 42, the node SCI starts and communicates with the subnet server SS (i.e. itself), via its localhost interface, in order to receive a subnet identifier. The node SCI obtains the subnet identifier A_id.

In step 43, the node SCI configures its DHCP server 8 by using the subnet identifier A_id. The node SCI also uses the subnet identifier A_id to compute a first IP address @A.1 that is assigned to the backbone line interface of the node SCI.

In step 44, the node C11 starts and requests an IP address (via its DHCP client 7) on its backbone line interface (this is the only activated interface of C11 at this point). The DHCP server 8 of the node SCI computes a second IP address @A.2 and sends it to the node C11 (as the IP address to be used for the backbone line interface of the node C11). At this stage, the subnet A is configured.

In step 45, the node C11 detects the presence of equipment on its sensor line interface and activates it consequently, thereby becoming a router node (since both interfaces are activated). Therefore, an election procedure is then launched by the node C11 for its sensor line interface. At this stage, the nodes C12, C13, C14 and C15 are also connected to the same sensor line as the node C11 but no subnet master nor subnet identifier are associated to this sensor line. Since the nodes C12, C13, C14 and C15 do not have yet any IP address, the node C11 is elected as subnet master 30. Then the node C11 requires a subnet identifier to the subnet server and obtains the subnet identifier B_id.

In step 46, the node C11 configures its DHCP server, for its sensor line interface, by using the subnet identifier B_id. The node C11 also uses the subnet identifier B_id to compute an IP address @B.1 that is assigned to its sensor line interface.

In step 47, by using its DHCP client, each of the nodes C12, C13, C14 and C15 receives (from the DHCP server 8 of the node C11) an IP address (@B.2, @B.3, @B.4 and @B.5 respectively) to be used for its sensor line interface. At this stage, subnet B is configured.

In step 48, the nodes C12 and C15 both activate their backbone line interface and become router nodes; the election procedure is launched by the nodes C12 and C15 for their respective backbone line interface. At this stage, nodes C22 and C12 are connected to the same sensor line which has no subnet master nor subnet identifier. Since the node C22 does not yet have any IP address, the node C12 is elected as subnet master. Then the node C12 requires a subnet identifier to the subnet server and obtains the subnet identifier C_id. Similarly, for nodes C25 and C15, with node C15 obtaining the subnet identifier D_id.

In step 49, the nodes C12 and C15 configure their DHCP server, for their backbone line interface, by using respectively the subnet identifiers C_id and D_id. Then the node C12 uses the subnet identifier C_id to compute an IP address @C.1 that is assigned to its backbone line interface. Similarly, the node C15 uses the subnet identifier D_id to compute an IP address @D.1 that is assigned to its backbone line interface.

In step 410, by using its DHCP client, node C22 receives (from the DHCP server 8 of the node C12) an IP address @C.2 to be used for its backbone line interface. At this stage, subnet C is configured. Similarly, by using its DHCP client, node C25 receives (from the DHCP server 8 of the node C15) an IP address @D2 to be used for its backbone line interface. At this stage, subnet D is configured.

In step 411, nodes C22 and C25 both activate their sensor line interfaces and thereby become router nodes, with the election procedure launched by the nodes C22 and C25 for their respective sensor line interfaces. At this stage, nodes C22 and C25 (and also nodes C23 and C24) are connected to the same sensor line. A conflict occurs between the two router nodes C22 and C25 both candidates able to act as subnet masters.

As detailed below, the election procedure allows selecting the subnet master among the two router nodes C22 and C25. In an embodiment, the subnet master is the router node having the lowest physical address (MAC address) value. The one having the highest value could have been chosen, or any other election criterion, which should be known and shared by all nodes of the subnet. We assume in the following description that the node C22 becomes the subnet master and requires a subnet identifier to the subnet server and obtains the subnet identifier E_id. Then the node C22 configures its DHCP server, for its sensor line interface, by using the subnet identifier E_id. The node C22 uses the subnet identifier E_id to compute an IP address @E.1 that is assigned to its sensor line interface.

In step 412, by using its DHCP client, each of the nodes C23, C24 and C25 receives (from the DHCP server 8 of the node C22) an IP address (@E.2, @E.3 and @E.4 respectively) to be used for its sensor line interface. At this stage, subnet E is configured.

After these steps, the network is configured as shown in FIG. 3 and comprises five subnets A to E. Note that when a new node is added in a subnet already configured, this new node obtains an IP address, from its DHCP client, for its interface connected to this subnet. When a node becomes a router node after a second interface has been activated (and a first interface being already activated), it starts an election procedure on the second interface. This may lead to a new configuration of concerned subnet, with a possible new election procedure.

As a matter of fact, a node might be in one of four states: INACTIVE, NEUTRAL, SLAVE or MASTER. Each node listens, on each of its activated interfaces, the messages (frames) sent by the other nodes.

Initially, the node is in an INACTIVE state in which it tries to get (with its DHCP client 7) an IP address. At a start event triggering the election mechanism, the node changes from the INACTIVE state to a NEUTRAL state.

For example, the start event belongs to the group comprising:
  application action (e.g. for the node which is configured to be subnet server SS, like the SCI in FIG. 3);
  transition of the node from a state "non-router" to a state "router";
  if the node is a router node, detection by the router node, which was formerly connected to another subnet without being the subnet master of this other subnet, of a cut resulting in the presence of the router node on the given subnet, distinct from the other subnet. The cut detection can be carried out, by the router node, according to different known solutions (like end of the lease on the IP address, change in the routing tables, etc.).

In the NEUTRAL state, the node periodically sends, in broadcast mode on the given subnet (i.e. without passing through the router node), a DISCOVER frame. Once the DISCOVER frame is sent, a timeout is triggered. In a particular embodiment, DISCOVER frame comprises:
  information (E TYPE) indicating that the frame is a DISCOVER frame;
  a node identification information relating to the router node. For example, the node identification information is the physical address (e.g. MAC address) associated with the interface through which the router node is connected to the given subnet; and
  a subnet server identification information of the subnet server (associated with the router node which has sent the DISCOVER frame), with an associated subnet server weighted parameter. Each subnet server has a different subnet server weighted parameter. As detailed below, this parameter is used to avoid problems of power between two subnet servers in case two independent networks are connected, each having its own subnet server).

In the MASTER state, the node periodically sends, in broadcast mode on the subnet (i.e. without passing through the router node), a MASTER_PRESENT frame comprising a node identification information (e.g. MAC address) and indicating that the node is the subnet master of the given subnet. Preferably, this frame has a similar content as a DISCOVER frame (see detail above), e.g. the same but E-TYPE information.

In a NEUTRAL state, the node may receive:
  a MASTER_PRESENT frame, in which case it changes status from NEUTRAL to SLAVE;
  a DISCOVER frame from another node. It then compares the identification information comprised in the received DISCOVER frame with its own (namely with its MAC address comprised in its sent DISCOVER frame) for election process of the subnet master.

Depending on the result of the comparison (see above: e.g. le lowest MAC address or any other decision criteria known by all nodes), the node changes from the NEUTRAL to the SLAVE state, with stopping the time out, or changes from the NEUTRAL to the MASTER state, meaning that the node has won the election and been elected as the subnet master of the subnet.

Before changing from NEUTRAL to MASTER, an option would be to wait that the timeout has elapsed; the interval might be used for confirmation of the status, with the node sending again a DISCOVER frame for confirmation than the other node receives it.

In a SLAVE state, the node may receive a MASTER_PRESENT frame from another node. It then compares the subnet server identification information comprised in the received MASTER_PRESENT frame with the one associated with itself (namely comprised in its sent DISCOVER frame) for confirmation of the subnet master associated to said node. Either the node will remain in the SLAVE state, or it might go back to a INACTIVE state, when the node has to change its associated subnet server: The node looses its IP address in order to start (with its DHCP client) a new IP address configuration. The node applies this to all its interfaces.

Similarly, when a node in a SLAVE state receives a DISCOVER frame from another node, it compares the subnet server identification information comprised in the received DISCOVER frame with the one associated with itself for confirmation of the subnet master associated to said node, and may either remain in the SLAVE state, or go back to a INACTIVE state for getting a new IP address configuration.

In a MASTER state, the node may receive a MASTER_PRESENT frame from another node. It then compares the subnet server identification information comprised in the received MASTER_PRESENT frame with the one associated with itself (namely comprised in its sent DISCOVER frame).
  if said subnet server identification is identical, then MAC addresses of the MASTER_PRESENT frames are compared for election of the subnet master: the node may keep its MASTER status (and send a MASTER_PRESENT frame) or change to SLAVE state;
  if said subnet server identification are not identical, then the subnet server weighted parameters comprised in the received MASTER_PRESENT frame and associated with the node (also comprised in the sent DISCOVER frame) are compared:
  either the node does not need to change its status, and it sends a MASTER_PRESENT frame;
  or the node loses its IP address, stops its DHCP server and returns to the INACTIVE state in order to start (with its DHCP client) a new IP address configuration, for being associated with the subnet server identified. The node applies this to all its interfaces.

Similarly, when a node in a MASTER state receives a DISCOVER frame from another node, it compares the subnet server identification information comprised in the received DISCOVER frame with the one associated with itself for confirmation of the subnet master associated to said node, and may either remain in the MASTER state, or go back to a INACTIVE state for getting a new IP address configuration.

As described above and detailed below with FIGS. 6A, 6B and 6C, when two independent networks each hosting a subnet server get connected, the subnet server of the resulting network (after merger) is elected according to the respecting weights of the former independent subnet servers. As a result, all network parameters of the respectively master and slave equipment formerly connected to the non-elected subnet server are reset to the inactive state.

The operating mode of the nodes on each of their interfaces, as described above, guarantees:
the presence of a single subnet master on each subnet, and
the fact that all the nodes of a network are associated with a single subnet server.

Indeed, each node, for each of its interfaces, sends frames (DISCOVER frames or MASTER_PRESENT frames, depending on its state for each interface) and also receives frames sent by the other nodes. By comparing the information contained in the received frames with their own information, the nodes change their state automatically, using deterministic rules that are common to all the nodes.

The proposed method improves the robustness of the network by allowing network reconfiguration at each topology change (cut, added/removed node, added/removed link . . . ). These proposed procedures can adapt to different network architectures without any configuration (other than the set of subnet identifiers in the subnet server) is required.

Figure 5:
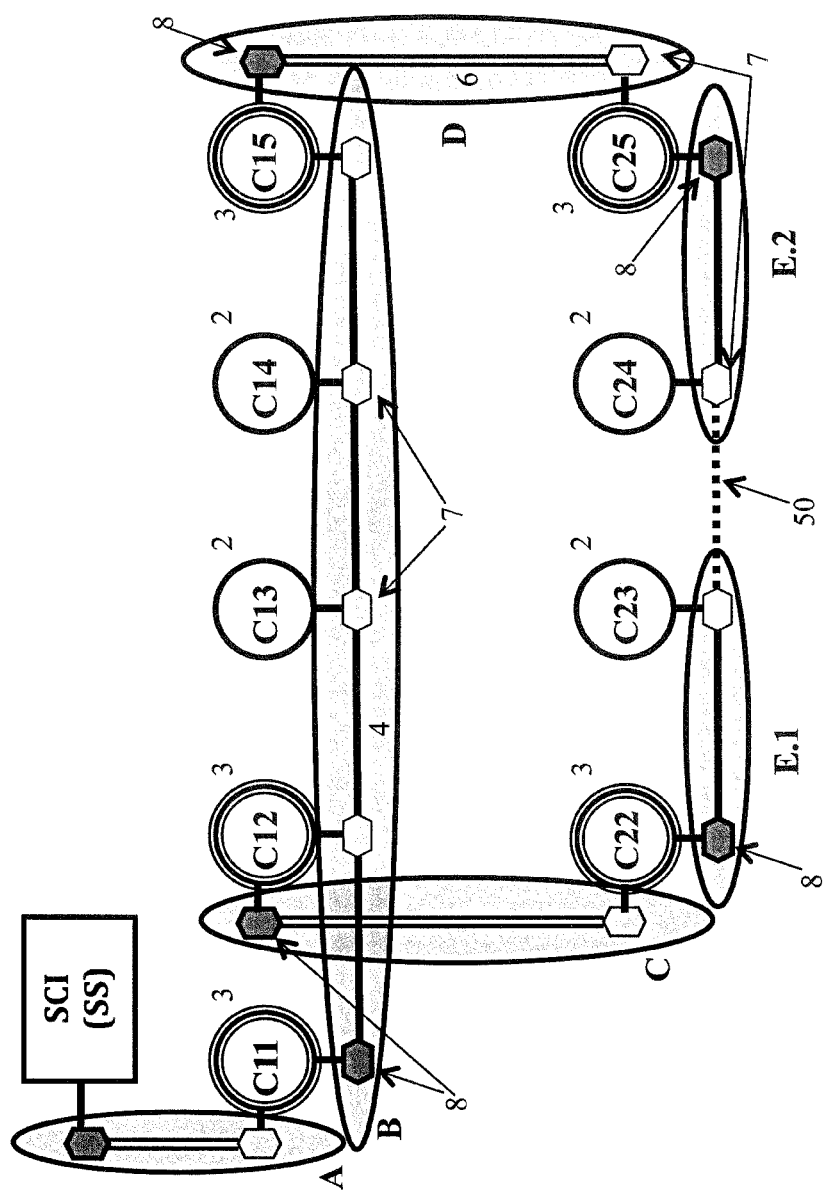
FIG. 5 depicts a first example of a dynamic network configuration in a case of connecting two subnets associated to a same subnet server.

FIG. 5 depicts a first example of a dynamic network configuration in a case of connecting, via a link 50, two subnets E.1 and E.2 associated to a same subnet server SS (SCI).

In this example, nodes C22 and C23 are connected by a first sensor line (subnet E.1), with node C22 as subnet master whereas nodes C24 and C25 are connected by a second sensor line (subnet E.2), with node C25 as subnet master. After connection of the two subnets E.1 and E.2, there are two subnet masters (nodes C22 and C25) on the subnet resulting from the merger of the two subnets E.1 and E.2.

According to the invention, thanks to the frames exchanged between the nodes, one of the two subnet masters (e.g. C22) will remain in the MASTER state (i.e. will remain the subnet master) and the other (e.g. C25) will change to the SLAVE state.

At the end of this dynamic network (re)configuration, the network will be as shown in FIG. 3, with E the subnet resulting from the merger of the two subnets E.1 and E.2.

Figure 6A:
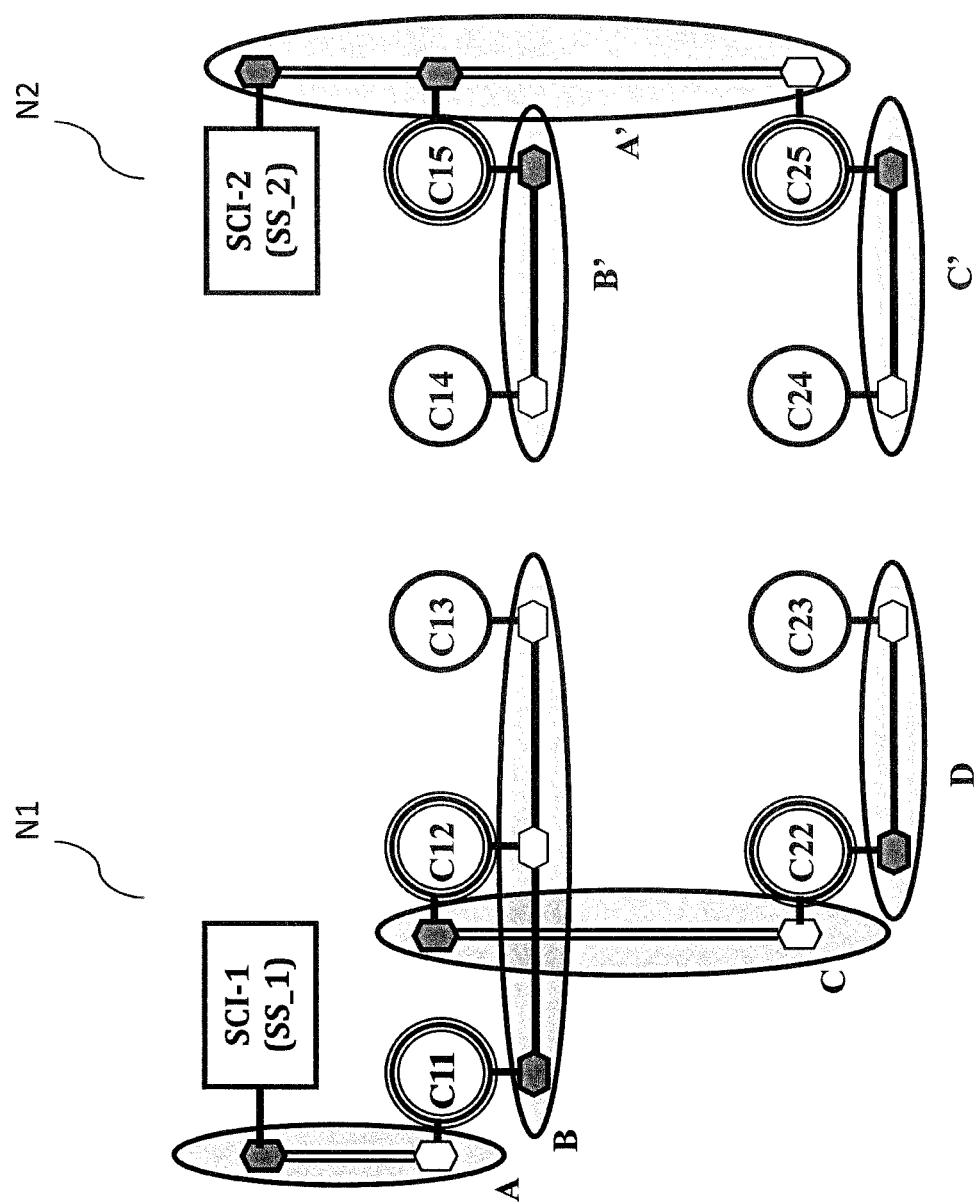
FIGS. 6A, 6B and 6C depict a second example of a dynamic network configuration in a case of connecting two networks each associated to a different subnet server.
Figure 6B:
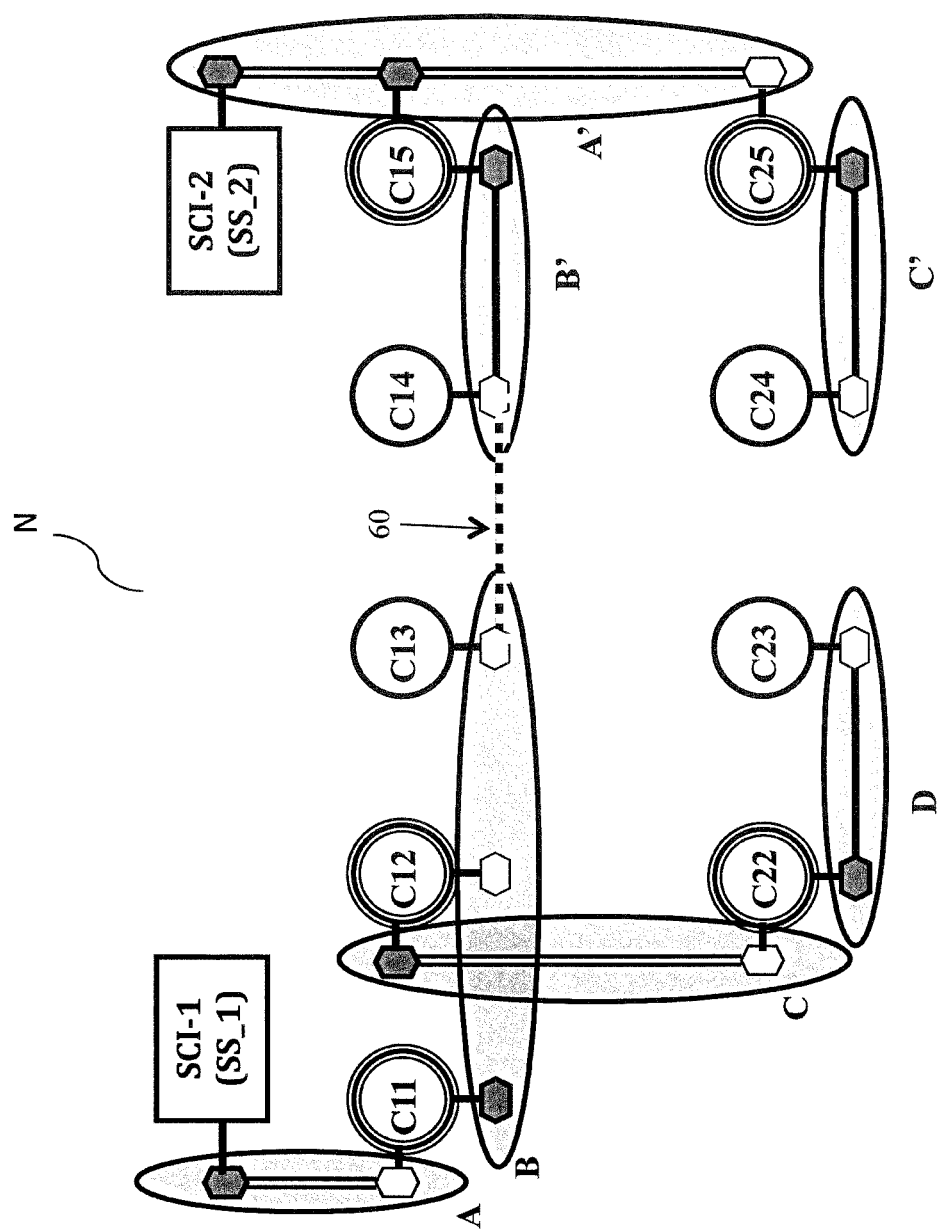
Figure 6C:
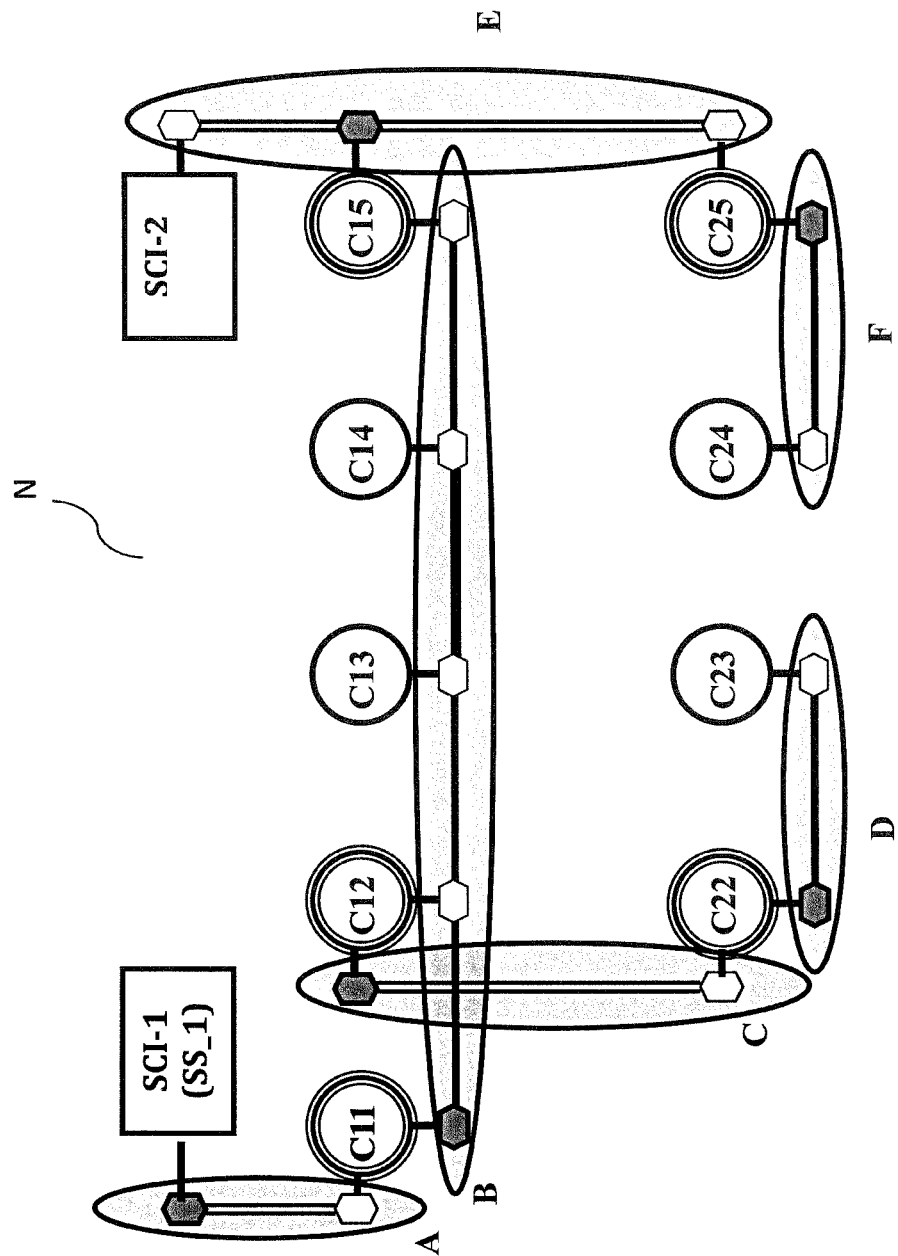

FIGS. 6A, 6B and 6C depict a second example of a dynamic network configuration in a case of connecting two networks each associated to a different subnet server.

As shown in FIG. 6A, there are initially two independent networks:
the first network N1 (left part of FIG. 6A) comprises a first subnet server SS_1 and four subnets: subnet A (backbone line) connecting nodes SCI_1 and C11, subnet B (sensor line) connecting nodes C11, C12 and C13, subnet C (backbone line) connecting nodes C12 and C22, and subnet D (sensor line) connecting nodes C22 and C23;
the second network N2 (right part of FIG. 6A) comprises a second subnet server SS_2 and three subnets: subnet A' (backbone line) connecting nodes SCI_2, C15 and C25, subnet B' (sensor line) connecting nodes C14 and C15 and subnet C' (sensor line) connecting nodes C24 and C25.

FIG. 6B shows the network N resulting from the merger of the first and second networks N1 and N2, once the nodes C13 and C14 are connected by a link 60.

In this example, thanks to the invention and the frames exchanged between the nodes, all the nodes previously associated with the second subnet server SS_2, including the subnet masters of the corresponding subnets A', B' and C', are henceforth associated with the first subnet server SS_1 and have a new IP address.

At the end of this dynamic network (re)configuration, the single network N will be as shown in FIG. 6C, and comprises a single subnet server SS_1 and six subnets: subnet A (backbone line) connecting nodes SCI_1 and C11, subnet B (sensor line) connecting nodes C11, C12, C13, C14 and C15, subnet C (backbone line) connecting nodes C12 and C22, subnet D (sensor line) connecting nodes C22 and C23, subnet E (backbone line) connecting nodes SCI_2, C15 and C25, and subnet F (sensor line) connecting nodes C24 and C25.

More generally, above method for configuring subnets and networks can be carried out regularly and at each stage of the life of any network, from first configuration to end of life, allowing a permanent adaptation to network changes and thereby optimized communication, in particular during seismic surveys.

Figure 1:
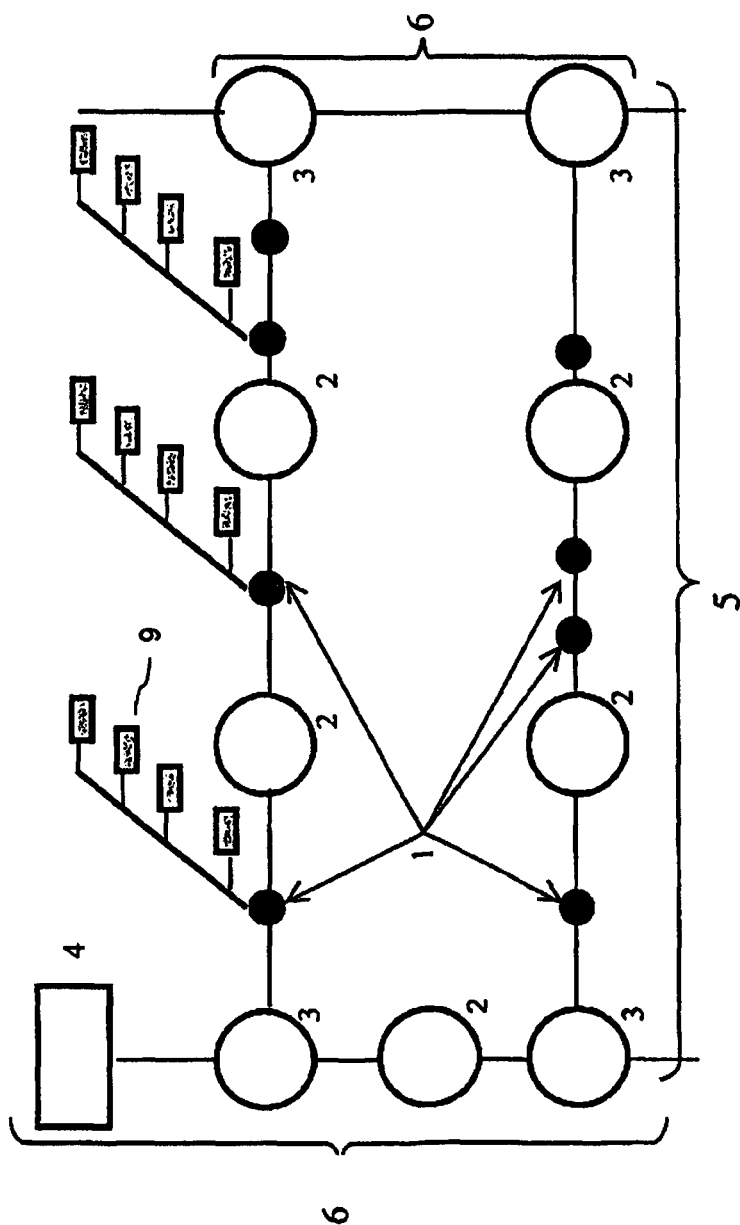
FIG. 1 depicts a seismic data acquisition system comprising a wired communication network according to the prior art.
Figure 8:
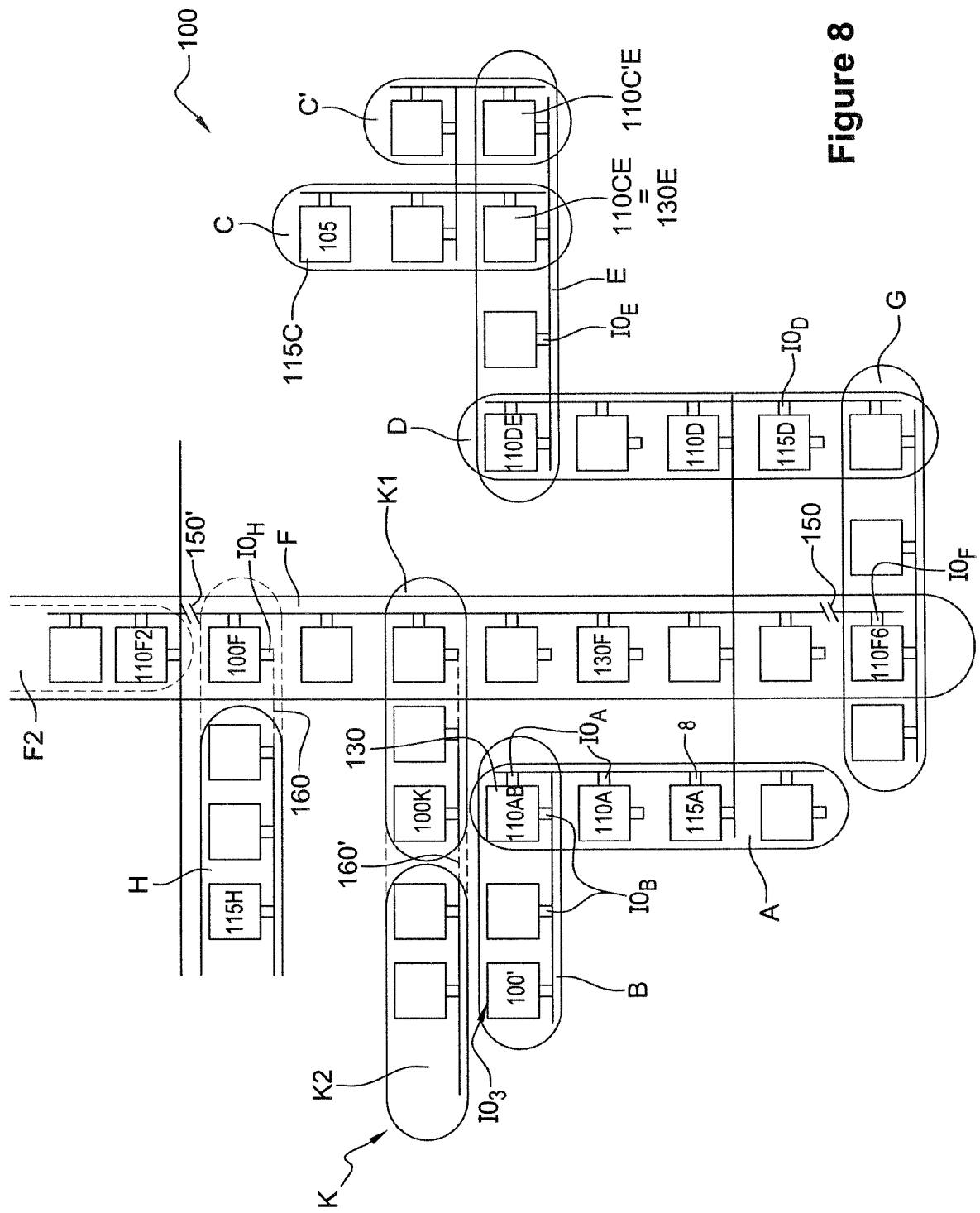
FIG. 8 shows an explicative embodiment of a seismic data acquisition system for the dynamic configuration of its subnets.

As disclosed in FIG. 8, a wired seismic acquisition system 100 comprises, among others (see also FIG. 1) numerous concentrators 110', 110AB 110CE, 110C'E, 110D, 110DE, 110E, 110F, 110F2, 110K, 110FG with two interfaces for connection to two (different) subnets. Each interface $IO_A$, $IO_B$, $IO_D$, $IO_E$, $IO_H$, $IO_G$, comprises an emitter that is able to send a request to any other equipment able to communicate through the concerned subnet, in particular requests for getting an IP address (or any other logical address). Besides this capacity of being a DHCP client 7, most of the interfaces do also have the capacity of becoming a DHCP server 8 with emitters of identifiers and/or frames. Concentrators also comprise receptors for receiving their address, any identifier for configuration purpose, and frames emitted by other nodes of the system 100.

The concentrators 110 may be linked to each other by same or different communication means, e.g. through cables. Note that FIG. 8 is for illustrative purpose and that some communication links are not represented for clarification of explanation below: most of the links indeed form loops which are rare in the figure. As mentioned, some concentrators may comprise only one interface, or more than two, like e.g. concentrator 110' with a third interface 103 for radio communication. Wired seismic networks 100 may also comprise a system controller interface 105 with dedicated functionalities.

Initial configuration of the seismic acquisition system 100 might be achieved at deployment of the concentrators 110 for survey, but in view of the number of devices on the field, according to a preferred embodiment, the method according to the invention might be performed without any initial configuration but the choice by the operator for some of the concentrators 115H, 115A, 115D and SCI 105, also referenced 115C, which are considered as subnet servers. Of course, any intermediate state between no initial configuration at all and complete predefined configuration could also be envisioned for the invention, and only one initial subnet server 115 (usually the SCI 105) might also be chosen.

Subnet servers as chosen are thus parameterized to have an interface being a DHCP server 8: said subnet servers 105, 115H, 115A, 115D are able to configure the subnet connected thereto. Preferably, the configuration of their subnet is achieved with a method according to the invention. At first, when only said chosen subnet servers are in fact activated (NEUTRAL), they transmit to themselves a request and receive a subnet identifier enabling configuration; in parallel, election of the subnet master is performed, very rapidly since the comparison of node identifications resumes to a comparison with itself.

Thenafter, each DHCP server 8 of a subnet server 105, 115H, 115A, 115D is able to provide the concentrators requesting it with a logical address on their interface connected to said subnet server. In particular, interfaces $IO_A$ of concentrators 110A are configured with subnet server 115A.

When a concentrator 110AB having been configured for a subnet A detects some link on its second interface $IO_B$, it attempts to propagate configuration on this second subnet B: it transmits a request to its subnet server 115A and receives a subnet identifier for configuring second subnet B. In parallel, subnet master election is performed for subnet B. Since neither other routers (concentrators with two possibly activated interfaces) nor subnet server is identified, concentrator 110AB is elected as subnet master 130 for subnet B and is able to configure subnet B with the second identifier it received.

Propagation of configuration continues from subnet to subnet. With multiple initially chosen subnet servers and/or complex networks with redundant options for communication (see FIG. 3), conflicts sometimes occur between two candidates as subnet masters. Then the election process allows the resolution.

For example, SCI 105 configures subnet C and, by propagation, subnet C', whereas subnet server 115D configures subnet D. For configuration of subnet E, concentrator 110CE receives a first subnet identifier from SCI 105, concentrator 110C'E receives a second subnet identifier from SCI 105, whereas concentrator 110DE receives a third subnet identifier from subnet server 115D: there are three candidates as subnet master 130E. Election process first compares the subnet server information within the first, second and third subnet identifiers, and selects a "winning" subnet server, e.g. SCI 105: concentrator 110DE is thus no more a candidate and indicates that third subnet identifier would not be used ("freeing" it). Election process compares node identification information of remaining candidates and e.g. concentrator 110CE is elected as subnet master: first subnet identifier is used by concentrator 110CE for configuration of the subnet E and of interfaces $IO_E$. Concentrator 110C'E in parallel sends a frame for "freeing" second subnet identifier, whereas concentrator 110DE also sends a frame to subnet D for indicating that concentrator 115D has lost its status of subnet server, with its interface $IO_D$ changing status from DHCP server 8 to DHCP client 7.

The fact that subnet server 115D has been replaced and that configuration of subnets concerned with this change (namely wherein subnet identifier included said subnet server information) should be modified, like subnet D, is propagated step by step to each concentrator 110D of the subnet D and then each subnet G . . . . It is clear that at the end, only one centralized subnet server, usually SCI 105, remains in case of a "closed" network.

Even in the absence of such messages indicating that a change in the configuration has to be made due to a change in subnet server, actualization of the configuration of the network and its subnets is periodic. In particular, each subnet master 130 sends a request to its subnet server to check whether the subnet identifier it uses remains valid, e.g. regularly before the end of the validity time associated to the subnet identifier. Should this check indicate an end of validity, e.g. because subnet server or network configuration has changed, then election of subnet master is carried out again.

Besides this regular check, an update of configuration might also be forced in case of a concentrator router 110FG being aware of a change in his subnet configuration. For example, in case of cuts of communication 150, 150' in subnet F, concentrators 110FG and 110F2 do not belong anymore to subnet F.

If the subnet master 130F of subnet F before cut is still present in remaining subnet F, then there is no change for said subnet.

For subnet F2 created by cut 150' however, the frame regularly sent by subnet master 130F is no more acknowledged by nodes of subnet F2: configuration of subnet F2 is carried out again, with requests from each candidate to a subnet server and election of a (new) subnet master among the candidates. Similarly, concentrator 110FG does not receive frame from its former subnet master 130F, but interface $IO_F$ does not receive any frame anymore and, after a waiting time, concentrator 110FG changes its status from router to non-router.

Similarly, subnet G might be configured again with loss of subnet server. Note that if concentrator 110FG was subnet master for subnet G, it can keep this property for said subnet although it lost his status as router if no new configuration of subnet G is needed (e.g. same subnet server and no change in the nodes for G).

Alternatively, concentrator 110F which had only one activated interface with subnet F may detect a link 160 on its second interface $IO_H$, leading to a transition of said concentrator 110F from non-router to router, and consecutive change in the configuration of subnet H. In this case also, a frame is sent to "new" subnet H for forcing election of possibly new subnet masters and consecutive new configuration.

If a connection 160' is made between subnets K1 and K2 resulting in a merged subnet K, router 110K receives two different frames from subnet masters, with different identifiers. Should subnet server identifier differ in these subnet identifiers, then identification of subnet master should be started again. In the other case, the comparison of the two frames leads to a selection of the master of subnet K. Would said router 110K have been subnet master, depending on the result of the selection, it may return to SLAVE status or remain the subnet master for K.

The process according to the invention thereby allows a dynamic configuration of subnets and networks, which is specifically advantageous in case of very large networks, like seismic acquisition systems which can comprise some hundred thousands of nodes 110 and crossed backbone and acquisition lines, wherein communication between nodes is subject to unpredictable modifications.

The invention claimed is:

1. A method for dynamically configuring a subnet of a network of nodes, each node comprising at least a first interface enabling a connection to a subnet, wherein at least one of said nodes, being defined as a router node, is able to be connected through said first interface to said subnet to be configured and comprises at least a second interface enabling simultaneous connection of said router node to a different subnet, said method comprising:

a first identification step of identifying at least one subnet server among the nodes of the network, said at least one subnet server being associated with the nodes of said subnet and able to provide subnet identifiers to said nodes at request;

a second determination step of determining of a subnet master of said subnet among candidates, said candidates comprising the router node(s) and, if any, a subnet server of said subnet, said second determination step comprising:

a process of election of a subnet master comprising: comparing node identification information of all candidates and determining the subnet master among the candidates in result of the comparison, a process of allocation of subnet identifiers to the candidates comprising:

a first step of transmitting by each of the candidates a request to the corresponding associated subnet server, a second step of receiving by each of said candidates, from the subnet server, in response to said request, at least one subnet identifier enabling to configure said subnet, said process of election of the subnet master and said process of allocation of subnet identifiers being run in parallel, a third configuration step of configuring the subnet by the elected subnet master with its received subnet identifier.

2. The method according to claim 1, wherein the method comprises the following steps:

transmitting, by a first node of the subnet, a frame comprising a subnet server identification of the subnet server associated with said first node;

receiving said frame by a second node of the subnet, and comparing the subnet server identification included in the received frame with a subnet server identification associated with said second node; and if said subnet server identifications are not identical: electing one of said subnet servers.

3. The method according to claim 2, further comprising:

if said subnet server identifications are identical and if the current state of both first and second nodes is subnet master: a further step of election of the subnet master for the subnet.

4. The method according to claim 2, wherein each of said subnet server identifications is associated with a weighted parameter and wherein electing one of said subnet servers results from the comparison of these subnet server weighted parameters.

5. The method according to claim 1 comprising:

periodical emission by the subnet master of a frame comprising a status information of said subnet master;

reception of said frame by the nodes of said subnet;

verification of said reception by the nodes for detecting a change in the configuration of the network.

6. The method according to claim 5 wherein the verification indicates to said nodes that reception is lost, the method being then repeated from the second determination step.

7. The method according to claim 5 wherein the frame comprises a subnet server identification information of a subnet server associated with the subnet master, and a subnet server weighted parameter.

8. The method according to claim 7 wherein the verification of the reception indicates to said nodes that subnet server identification has been modified, the method being then repeated from the first identification step.

9. The method according to claim 8 comprising a fourth confirmation step, carried out before or after the third configuration step, wherein the elected subnet master requests to the corresponding associated subnet server within a period of time less that the validity duration whether the subnet identifier can be kept, and if yes, the validity period of the subnet identifier is reinitialized, if no, then the method is repeated from the second determination step.

10. The method according to claim 7 wherein the verification of the reception indicates to said nodes that subnet server identification has not been modified, the method comprising then a further step of election of the subnet master for said subnet.

11. The method according to claim 1 wherein the second allocation process provides, together with the subnet identifier, a validity duration of said subnet identifier, the method being repeated from the second determination step when the validity duration is expired.

12. Method for dynamically configuring a network comprising a plurality of subnets comprising the method for dynamically configuring a subnet of said network according to claim 11 wherein the second determination step and the third configuration step are carried out for each subnet comprising at least one router node, the validity duration being identical for each subnet.

13. Method for dynamically configuring a network with a plurality of subnets comprising the method for dynamically configuring a subnet of said network according to claim 1 wherein the second determination step and the third configuration step are carried out for each subnet comprising at least one router node.

14. The method for dynamically configuring a network according to claim 13 wherein the network is a seismic data acquisition network whose nodes are concentrators receiving seismic data, wherein the plurality of subnets comprises acquisition lines and backbone lines.

15. A non-transitory computer-readable carrier medium storing a computer program that includes program code instructions for implementing the method according to claim 1.

16. Acquisition system comprising a plurality of subnets of a network, each subnet comprising nodes, each node comprising at least a first interface enabling a connection to a subnet, wherein at least one of said nodes, being defined as a router node, is able to be connected through said first interface to said subnet to be configured and comprises at least a second interface enabling a simultaneous connection of said router node to a different subnet, said system comprising a processing unit configured for implementing the method according to claim 1.

17. The acquisition system of claim 16, wherein each subnet comprises router nodes that include at least a seismic concentrator configured for seismic data acquisition.

* * * * *